Patented Nov. 11, 1952

2,617,269

UNITED STATES PATENT OFFICE 2,617,269

SURFACE HAVING LOW ADHESION TO ICE

Robert Smith-Johannsen, Schenectady, N. Y., assignor to General Electric Company, a corporation of New York No Drawing. Application June 17, 1949,
Serial No. 99,855

6 Claims. (Cl. 62—108.5)

This invention is concerned with surfaces having low adhesion to ice and methods of preparing such surfaces. More particularly, the invention relates to a surface comprising an outer coating of polymeric monochlortrifluoroethylene.

Many attempts have been made to decrease the adhesion of different surfaces to ice or icing conditions. Such problems are particularly important in the aviation industry where great difficulty and danger are encountered during the flight of airplanes due to icing conditions resulting from the formation of layers of ice on either the wings or propellers of the aircraft. Attempts have been made to overcome the aforementioned icing conditions as, for instance, by coating the wings and propellers of airplanes with various waxes, coating compositions, etc. For the most part, these attempts have been either unsatisfactory or unsuccessful due to the fact that either the decrease in ice adhesion has been too small or else the coating applied has worn away so fast due to the abrasive and leaching action of the atmosphere and the elements, that it has been necessary to recoat the surfaces so frequently as to render the method impractical.

I have now discovered that I am able to obtain surfaces having low adhesion to ice and, in addition, I have found that such surfaces offer a relatively low support for build-up of icy layers. In addition, I have found that surfaces obtained in accordance with my claimed invention are substantially permanent and require no additional treatment once the surface has been laid down.

In accordance with my invention, I apply to the surface whose ice adhesion it is desired to lower, a layer or film comprising polymeric monochlortrifluoroethylene. Such polymeric materials having a softening point above 180° C. and methods of preparing the same are more particularly disclosed in British Patents 465,520 and 578,168.

The method of applying the aforementioned polymeric material may comprise any one of several ways. For example, I may wrap a tape around the surface whose ice adhesion it is desired to lower, or else the same tape or sheets of the polymeric monochlortrifluoroethylene may be adhered to the surface by suitable means. Another method comprises applying solutions of the polymeric material to the surface wherein the solvent for the polymeric monochlortrifluoroethylene is sufficiently volatile to leave behind, after application of the solution, a thin film of the polymer. Where such methods are applicable as, for instance, in the treatment of metallic aircraft propellers or other metallic surfaces, dispersions of the polymeric monochlortrifluoroethylene may be applied and the coated surface heated at a sufficiently high temperature, for example, of the order from about 200° to 300° C., to cause coalescence of the particles of polymer into a continuous film.

It was surprising to find that polymeric monochlortrifluoroethylene offered such low adhesion to ice since attempts to use a similar polymer, specifically polymeric tetrafluoroethylene, showed erratic results, and in many cases resulted in a high adhesion to ice.

In order that those skilled in the art may understand how the present invention may be practiced, the following examples are given by way of illustration and not by way of limitation.

Example

Water was allowed to freeze at a temperature of −13° C. on a flat sheet of polymeric monochlortrifluoroethylene. During freezing, a thin steel bar was placed on ⅛ inch spacing legs on the polymeric sheet and water introduced through a hole in the steel bar so that when the water froze it stuck together both the metal and the polymeric monochlortrifluoroethylene by means of the formed ice. As a control, other surfaces coated with, for example, a polystyrene-coumar lacquer, a silicone resin, polyethylene, and polymeric tetrafluoroethylene were also frozen with the metal bar in the same manner as that used in connection with the polymeric monochlortrifluoroethylene. Each of the samples was then tested for the shear force required to break the bond between the sample and the ice. Following are the results of such tests.

| | Shear gm./cm.$^2$ at −10° C. |
|---|---|
| Polymeric monochlortrifluoroethylene | 400 |
| Polystyrene-coumar lacquer | 2000 |
| Silicone resin | 1800 |
| Polyethylene | 1900 |
| Polymeric tetrafluoroethylene | Very erratic, poor |

Besides having low adhesion to ice, surfaces coated with the polymeric monochlortrifluoroethylene are at least as flexible as the foundation for the polymeric coating since the polymeric monochlortrifluoroethylene continues to be flexible at temperatures well below the freezing point of water. In addition, the use of polymeric monochlortrifluoroethylene is accompanied by the advantage that the latter is flame resistant and does not support combustion which in the case of aircraft is of great advantage.

It will, of course, be understood that the coating of polymeric monochlortrifluoroethylene may also be applied to other surfaces as, for example, aluminum (e. g., ice cube trays and dividers, etc.), brass, steel, wood (e. g., skiing equipment), glass (for example, on windshields of automobiles and airplanes), other plastic materials, etc., without departing from the scope of my invention.

What I claim as new and desire to secure by Letters Patent of the United States, is:

1. A solid surface exhibiting low adhesion to ice, the said surface containing a thin coating thereon consisting of solid polymeric monochlorotrifluoroethylene having a softening point above 180° C.

2. An aluminum ice cube tray and divider exhibiting low adhesion to ice, the outer surfaces of said ice cube tray and divider being coated with a thin coating of a composition consisting of solid polymeric monochlortrifluoroethylene having a softening point above 180° C.

3. A glass windshield comprising an under surface of glass and an outer thin coating consisting of solid polymeric monochlortrifluoroethylene having a softening point above 180° C. the said polymeric material having low adhesion to ice.

4. The method of reducing the adhesion of ice to an aluminum ice cube tray and divider which comprises coating the surfaces of said tray and divider with a thin film of a composition consisting of solid polymeric monochlorotrifluoroethylene having a softening point above 180° C.

5. The method of reducing the adhesion of ice to a glass surface which comprises coating the said surface with a thin film of a composition consisting of solid polymeric monochlorotrifluoroethylene having a softening point above 180° C.

6. The method of reducing the adhesion of ice to a solid surface which comprises coating the said surface with a thin film consisting solely of solid polymeric monochlorotrifluoroethylene having a softening point above 180° C.

ROBERT SMITH-JOHANNSEN.

REFERENCES CITED

The following references are of record in the file of this patent:

UNITED STATES PATENTS

| Number | Name | Date |
|---|---|---|
| 2,279,252 | Slunder | Apr. 7, 1942 |
| 2,510,078 | Compton et al. | June 6, 1950 |

FOREIGN PATENTS

| Number | Country | Date |
|---|---|---|
| 465,520 | Great Britain | May 3, 1937 |
| 578,168 | Great Britain | June 18, 1946 |

OTHER REFERENCES

Miller et al., Industrial and Engineering Chemistry, pp. 333–337, vol. 39, No. 3.

Modern Plastics, October 1948, "New High Temperature Thermoplastics," pp. 168–172.